(12) United States Patent
Hibbard (10) Patent No.: US 10,197,174 B1
(45) Date of Patent: Feb. 5, 2019

(54) LOOP FLUSHING VALVE (71) Applicant: Hydro-Gear Limited Partnership, Sullivan, IL (US)

(72) Inventor: John Tyler Hibbard, Indianapolis, IN (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 94 days.

(21) Appl. No.: 15/496,945

(22) Filed: Apr. 25, 2017

Related U.S. Application Data (63) Continuation of application No. 14/713,445, filed on May 15, 2015, now Pat. No. 9,638,341.

(60) Provisional application No. 62/020,741, filed on Jul. 3, 2014, provisional application No. 61/994,667, filed on May 16, 2014.

(51) Int. Cl.
*G05D 11/00* (2006.01)
*F16K 17/04* (2006.01)
*F16K 1/32* (2006.01)
*F16K 31/12* (2006.01)

(52) U.S. Cl.
CPC .......... *F16K 17/044* (2013.01); *F15B 21/042* (2013.01); *F16K 1/32* (2013.01); *F16K 31/12* (2013.01); *Y10T 137/2567* (2015.04)

(58) Field of Classification Search
CPC ......... Y10T 137/2567; Y10T 137/2521; Y10T 137/2564
See application file for complete search history.

(56) References Cited

U.S. PATENT DOCUMENTS

| | | | |
|---|---|---|---|
| 2,900,166 A | 8/1959 | Boosman | |
| 2,961,829 A | 10/1959 | Weisenbach | |
| 3,308,817 A * | 3/1967 | Seeler | B01F 3/028 128/203.25 |
| 3,550,611 A | 12/1970 | Vagn Baatrup | |
| 3,901,261 A | 8/1975 | Riis | |
| 4,128,113 A | 12/1978 | Hart | |
| 4,324,311 A | 4/1982 | Farris | |
| 4,332,134 A | 6/1982 | Cochran et al. | |
| 4,343,601 A | 8/1982 | Thorson | |
| 4,467,825 A | 8/1984 | Boyd | |
| 4,691,730 A | 9/1987 | Portolese et al. | |
| 4,936,334 A | 6/1990 | Hendershot | |
| 5,038,827 A | 8/1991 | Heffner et al. | |
| 5,190,356 A | 3/1993 | Knowles | |
| 6,068,451 A | 5/2000 | Uppal | |
| 6,263,670 B1 | 7/2001 | Gluck et al. | |
| 6,332,393 B1 | 12/2001 | Trimble | |

(Continued)

OTHER PUBLICATIONS

Eaton Brochure, "1HSH701—Hot Oil Shuttle Valve," Dec. 2009 (2pp.).

(Continued)

*Primary Examiner* — R. K. Arundale
(74) *Attorney, Agent, or Firm* — Neal, Gerber & Eisenberg LLP (57) ABSTRACT

A loop flushing valve includes a valve body, a fluid passage plug, and a poppet. The valve body includes an internal shoulder and a bore. The fluid passage plug is disposed in the bore and includes a fluid passage in fluid communication with the bore and a system fluid passage. The poppet is captured between the internal shoulder and the fluid passage plug and extends through the valve body.

16 Claims, 7 Drawing Sheets (56) References Cited

U.S. PATENT DOCUMENTS

| | | |
|---|---|---|
| 6,371,149 B1 | 4/2002 | Gust et al. |
| 6,430,923 B1 | 8/2002 | Meier |
| 7,430,860 B2 | 10/2008 | Whitaker et al. |
| 8,132,588 B1 | 3/2012 | Langenfeld et al. |
| 8,171,951 B2 | 5/2012 | Quendt et al. |
| 8,347,620 B2 | 1/2013 | Yu et al. |
| 8,991,416 B2 | 3/2015 | Bresnahan |
| 2004/0187491 A1 | 9/2004 | Whitaker et al. |

OTHER PUBLICATIONS

Sauer Danfoss, "Loop Flushing Valve Technical Information," Aug. 2010 (8 pp.).

\* cited by examiner

LOOP FLUSHING VALVE

CROSS REFERENCE

This application is a continuation of U.S. application Ser. No. 14/713,445, filed on May 15, 2015, which claims the benefit of U.S. Provisional Application No. 61/994,667, filed on May 16, 2014, and U.S. Provisional Application No. 62/020,741, filed on Jul. 3, 2014. The contents of these applications are incorporated herein by reference.

BACKGROUND OF THE INVENTION

This invention relates generally to the design of valves and, more particularly, to the design of a loop flushing valve for use in a hydraulic circuit.

SUMMARY OF THE INVENTION

The loop flushing valve disclosed herein has use in many applications and is depicted herein as used in a hydraulic component such as a hydraulic pump or motor or a hydrostatic transmission or transaxle having an integral hydraulic circuit comprising a pump and motor in fluid communication. The valve disclosed herein operates in a manner similar to that of an overlapped spool valve used as a loop flushing valve, but is less complex and easier to assemble. A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. This specification is intended to be taken as a whole and interpreted in accordance with the principles of the inventions as taught herein and understood by one of ordinary skill in the art.

Figure 1:
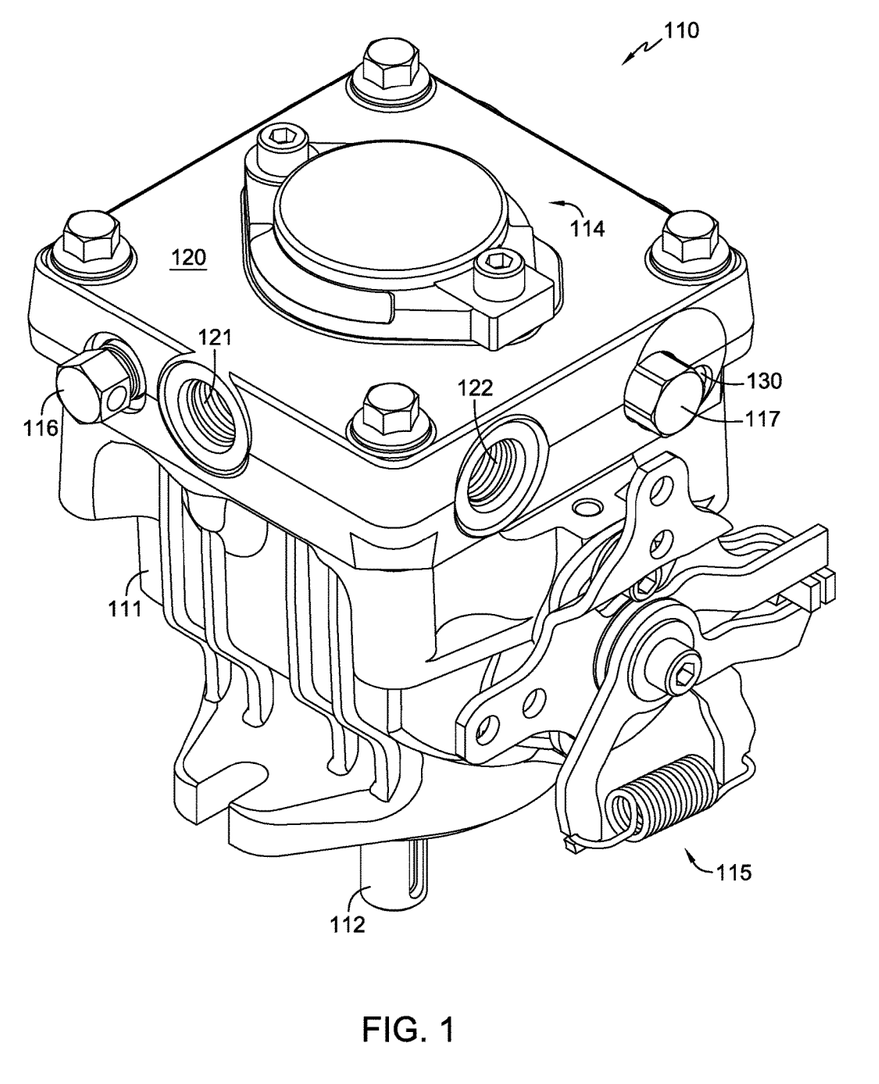
FIG. 1 is a perspective view of an exemplary pump assembly in which a valve in accordance with the teachings herein may be used.
Figure 2:
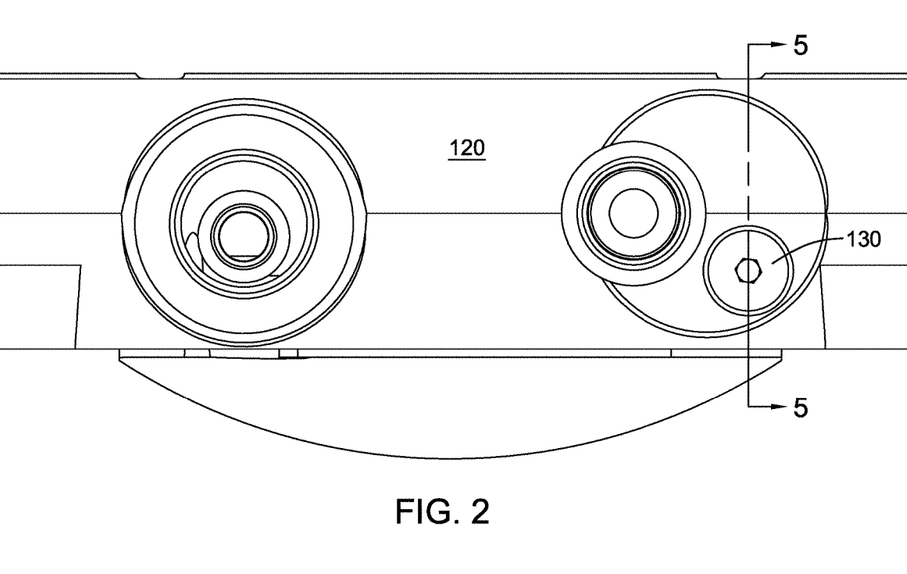
FIG. 2 is a side elevational view of the end cap portion of the pump assembly shown in FIG. 1.
Figure 3:
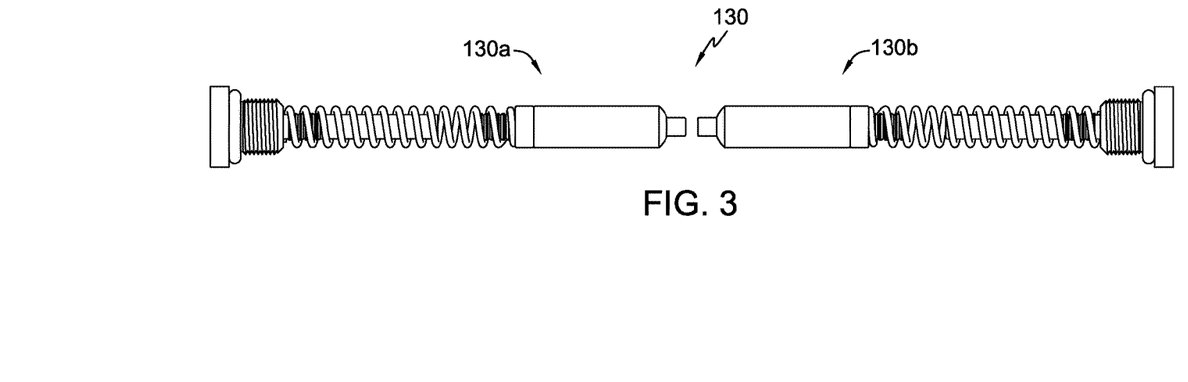
FIG. 3 is a side elevational view of a valve as disclosed herein.
Figure 8:
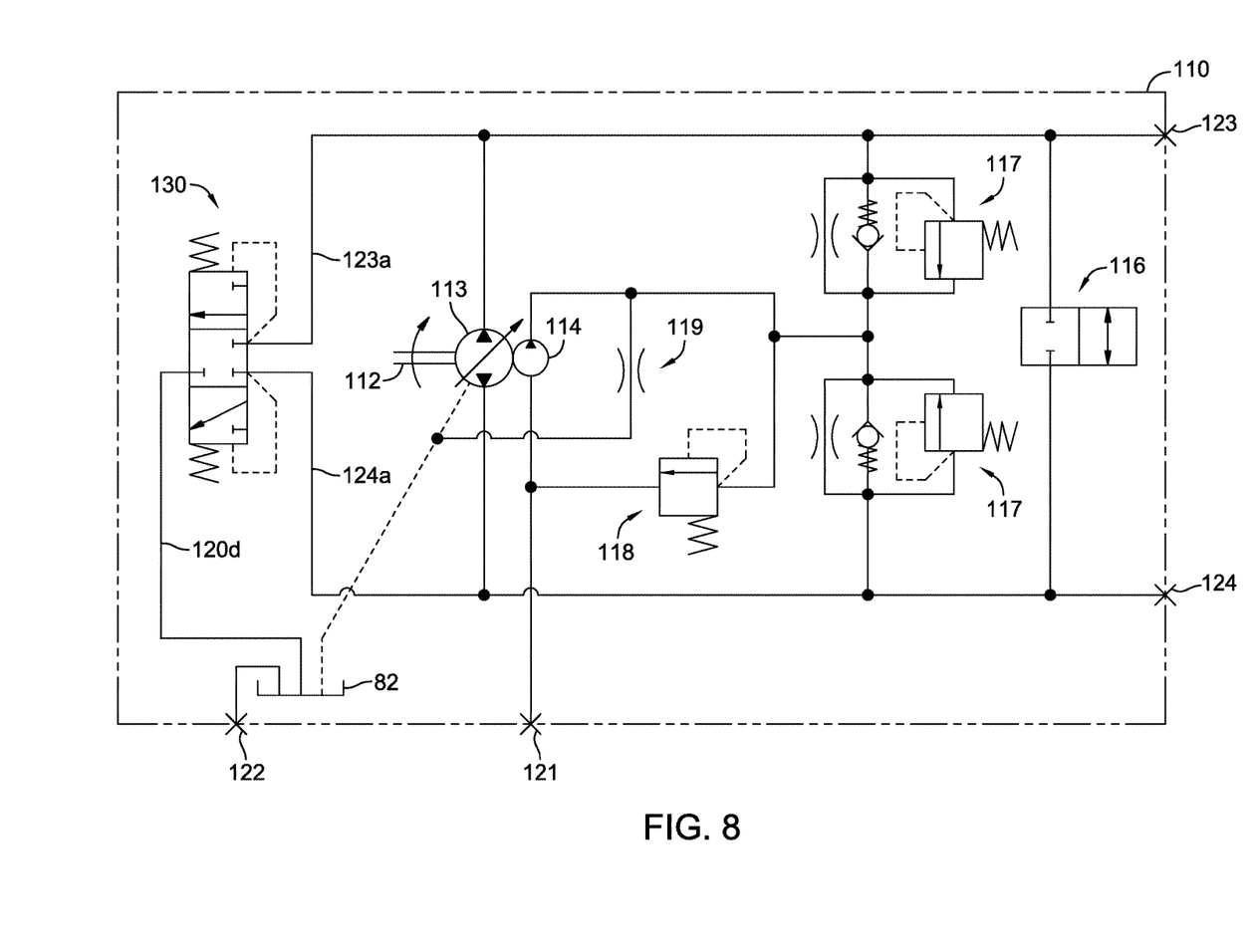
FIG. 8 is a schematic view of the assembly in which the valve disclosed herein is incorporated.

The loop flushing valve disclosed herein may be used in a variety of applications and is depicted herein used in end cap 120 of variable displacement pump assembly 110, as depicted in FIGS. 1 and 8. The basic construction of such a pump assembly is known in the art, and disclosed in commonly owned U.S. Pat. No. 6,332,393, the terms of which are incorporated herein by reference.

Pump assembly 110 includes an axial piston pump 113 driven by input shaft 112 disposed in housing 111 and running on end cap 120. Housing 111 and end cap 120 cooperate to form internal sump 82, shown schematically in FIG. 8. A charge pump 114 and a return to neutral (RTN) assembly 115 are also provided. End cap 120 includes charge inlet port 121 connected to charge pump 114 and case drain port 122 connected to internal sump 82. System ports 123 and 124 are connected to a pair of system passages 123a and 124a formed in end cap 120. As is known, a set of check/relief valves 117 and a bypass valve 116 are used between system fluid passages 123a and 124a. Relief valve 118 is used with charge pump 114 to relieve excess pressure and a bleed passage 119 may be provided to ensure a constant fluid flow to help cool pump 113. Depending upon system requirements, the size of charge pump 114, and the desired opening pressure of flushing valve 130, bleed passage 119 may not be required or may become too small to be practical or useful.

Figure 9:
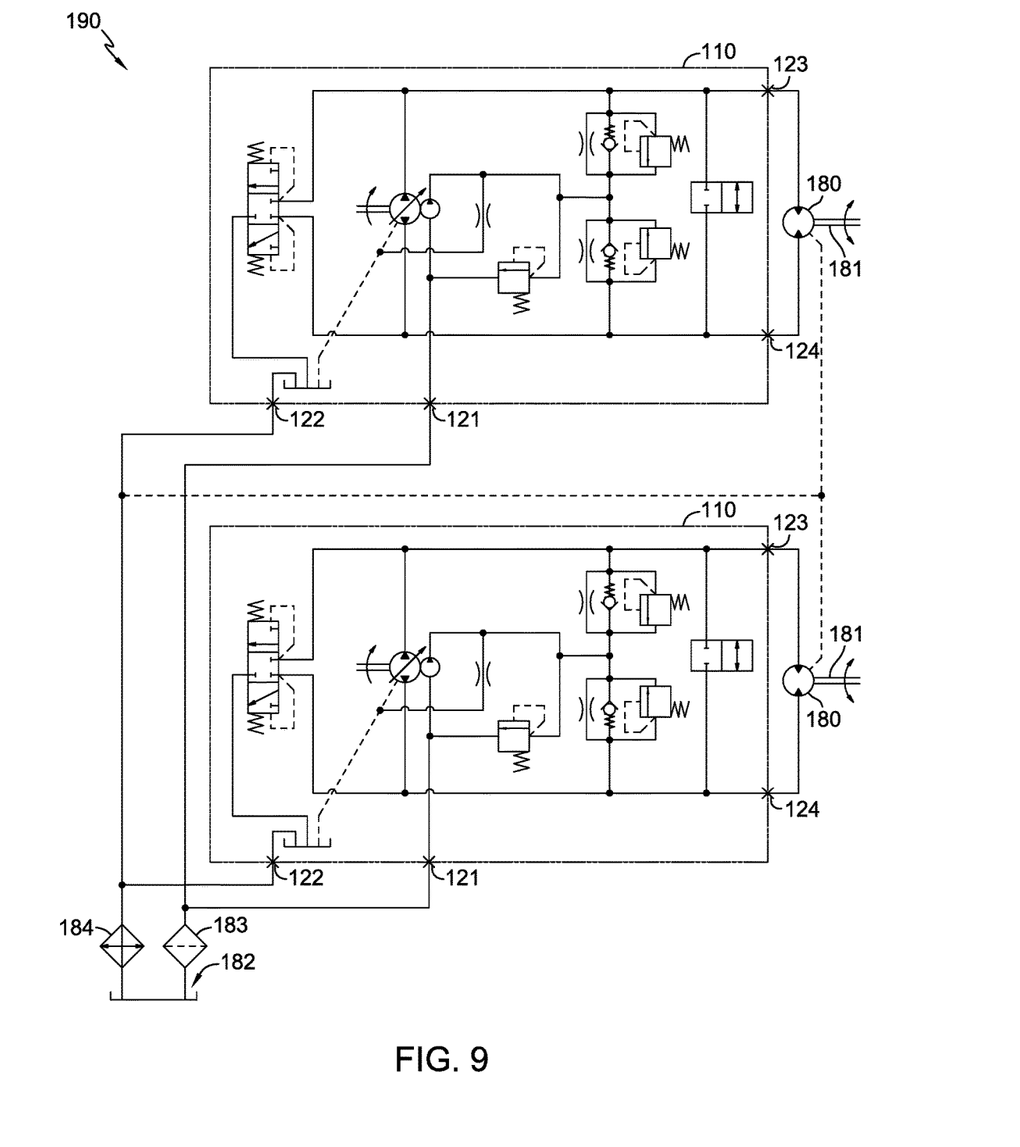
FIG. 9 is a schematic view of a vehicle incorporating two of the assemblies in which the valve disclosed herein is incorporated.

Flushing valve 130 is disposed between system fluid passages 123a and 124a, as shown in FIG. 8, which depicts the hydraulic system schematically, while FIG. 9 schematically shows a zero turn vehicle 190 in which two separate pump assemblies 110 using separate flushing valves 130 may be incorporated. Each pump assembly 110 may be connected to a separate hydraulic motor 180, which drives a separate motor output shaft or axle 181. In the vehicle embodiment of FIG. 9, the connection of both pump assemblies 110 to a common reservoir 182 is depicted, along with a filter 183 connected between common reservoir 182 and the two charge pump inlet ports 121. Heat exchanger 184 is located between the two case drain ports 122 and common reservoir 182.

Figure 4:
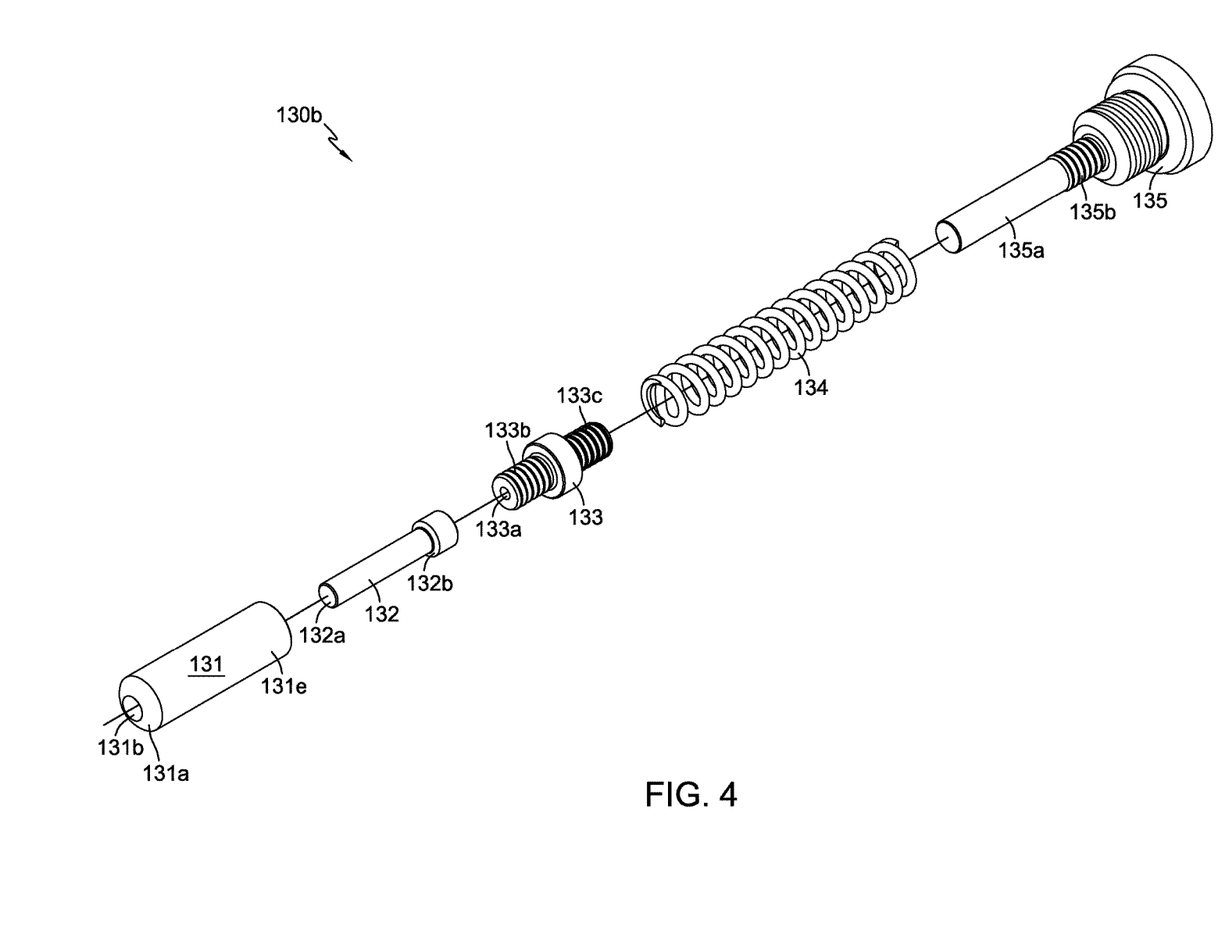
FIG. 4 is an exploded perspective view of one of the valve subassemblies of FIG. 3.
Figure 5:
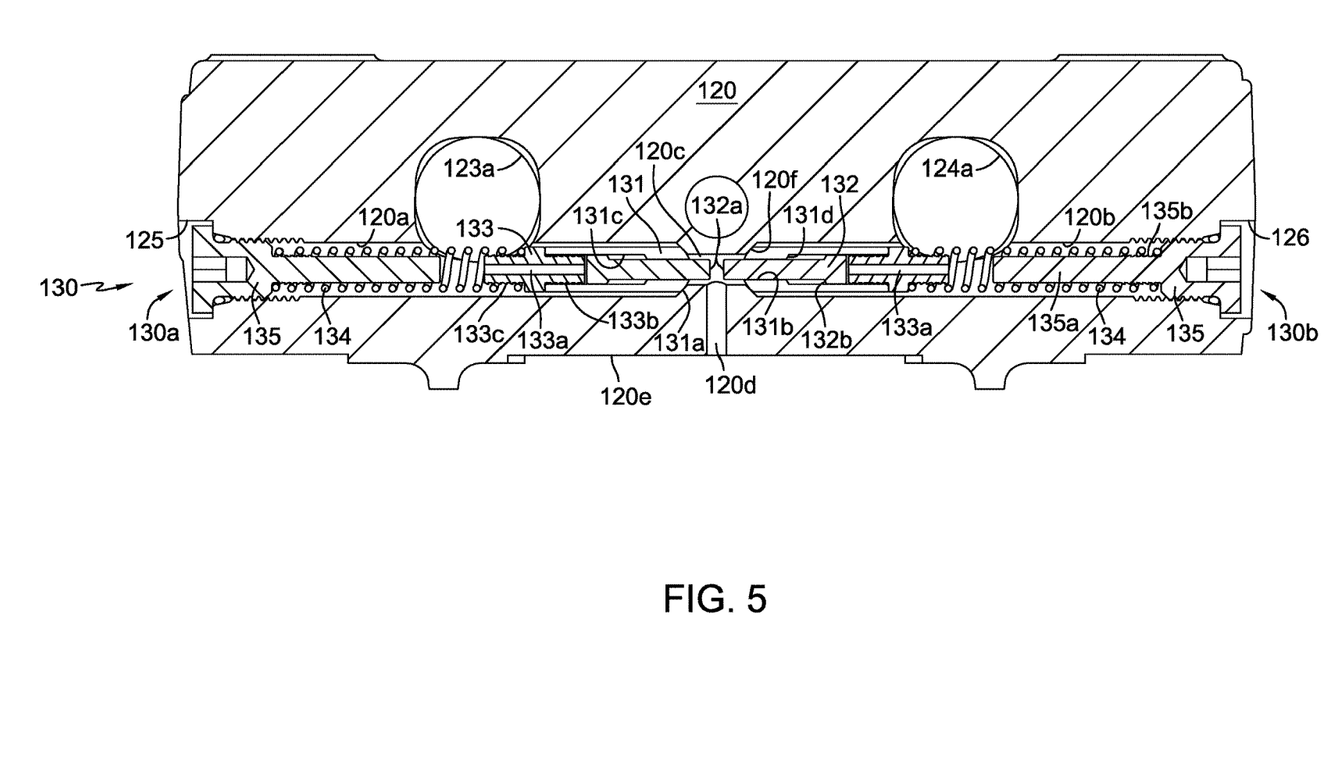
FIG. 5 is a cross-sectional view of the end cap with the valve, along the lines 5-5 of FIG. 2, where both valve subassemblies are in the closed position.

Two valve subassemblies 130a and 130b are depicted in, e.g., FIG. 5, and the construction of each valve subassembly is shown most clearly in the exploded view of subassembly 130b depicted in FIG. 4. It will be understood that the construction of valve subassembly 130a will be substantially identical to the following description of valve subassembly 130b. For purposes of convenience only in connection with the following description, the term "proximal" is used to denote an end closer to port plug 135 and "distal" is used to denote an end located further from port plug 135. In addition, the terms "left" and "right" are used for convenience only with respect to the views such as those of FIGS. 5, 6 and 7.

Valve subassembly 130b includes a main port plug 135, spring 134, fluid passage plug 133, poppet 132 and main valve body 131. Main valve body 131 includes a passage extending therethrough, and specifically a first, smaller diameter bore 131b adjacent its distal end and connected to a second, larger diameter bore 131c adjacent to its proximal end.

Port plug 135 includes an optional stem 135a having optional spring grip serrations 135b formed thereon at the inner portion thereof. Fluid passage plug 133 has a fluid passage 133a extending therethrough, and a set of spring grip serrations 133c, similar to the spring grip serrations 135b, formed on one side thereof to engage one end of spring 134, and a set of crimp serrations 133b formed on the other side thereof to engage the larger diameter bore 131c at the proximal end 131e of main valve body 131, by means of crimping proximal end 131e, such that plug 133 and main valve body 131 move axially together. As shown, serrations 133b and 133c may be the same as one another (mirrored), and the stems of plug 133 on which they are formed may be of the same length, such that fluid passage plug 133 is symmetrical in order to prevent assembly errors. Other means of connecting plug 133 to main valve body 131 could also be used.

Both valve subassemblies are biased to the closed position in this invention. In the embodiment depicted, a spring 134 is disposed between port plug 135 and fluid passage plug 133 to assist in biasing the valve subassembly to the closed position. The two sets of spring grip serrations 135b and 133c act to hold the ends of spring 134 on these respective plugs 133, 135 to aid in assembly and installation, although it will be understood that other means of connection could be used and that connection of spring 134 to plug 135 is optional. The use of a structure such as stem 135a is preferable in that it assists in preventing deflection of spring 134.

A poppet 132 is disposed inside main valve body 131, as shown in FIG. 5, and has a distal end 132a, which can be referred to as a contact end, and a shoulder 132b formed near its proximal end, which is adjacent to and engagable with fluid passage plug 133. The range of motion of poppet 132 within main valve body 131 is limited in one direction by the interaction of shoulder 132b with an internal shoulder, or poppet stop 131d, formed at the interface between first, smaller diameter bore 131b and second, larger diameter bore 131c.

Figure 6:
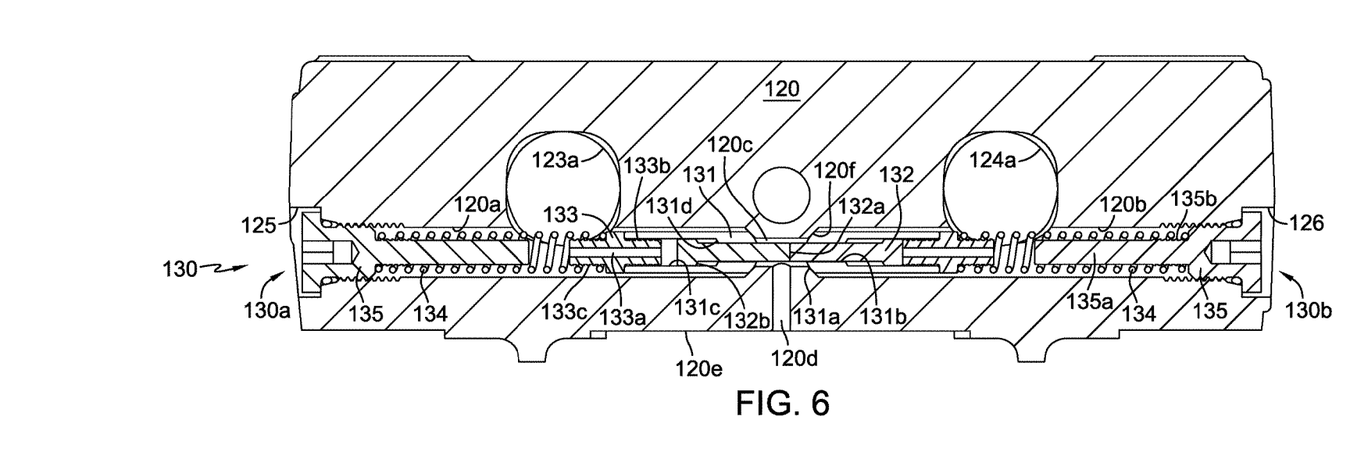
FIG. 6 is a cross-sectional view similar to FIG. 5, with both valve subassemblies in the closed position and the system under pressure.
Figure 7:
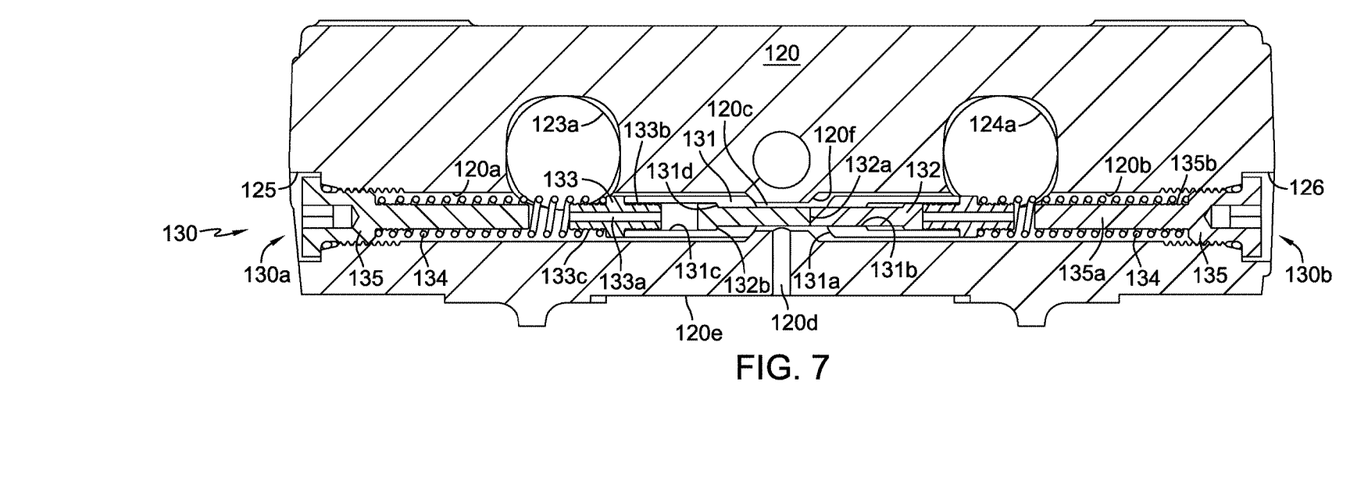
FIG. 7 is a cross-sectional view similar to FIGS. 5 and 6, with one of the valve subassemblies in the open position.

The cross-sectional views of FIGS. 5, 6 and 7 show the two valve subassemblies 130a and 130b inside end cap bores 120a and 120b, respectively, and in fluid communication with system fluid passages 123a and 124a, respectively. First bore 120a and second bore 120b meet in a connecting passage 120c and are connected to outlet passage 120d, which is then indirectly connected to case drain port 122. Both valve subassemblies 130a and 130b are depicted in the closed position in FIG. 5, in that main valve body 131 is pressed against valve seat 120f on each, thereby preventing fluid flow from either system fluid passage 123a, 124a to outlet passage 120d. In FIG. 5, the distal ends 132a of the two poppets are depicted as not being in contact with one another for clarity of disclosure, but it will be understood that once the system is assembled and any pressure is applied to the system passages 123a and 124a, the distal ends 132a of the two poppets 132 will be in contact with one another, such as is shown in FIG. 6. It will also be understood that when the valve subassemblies are in the "closed" position, there is no material fluid flow from the respective fluid side 123a or 124a to the outlet passage 120d, although there may still be de minimus leakage around the various components.

In FIG. 6, the system passage 123a is under higher pressure than the system passage 124a. This could be a minor pressure differential, such as when the system is in neutral or near neutral. At this depicted position, right side poppet 132 has contacted right side plug 133, but has not yet applied sufficient force to right side plug 133 against the bias of spring 134 to open the right side of the valve; i.e., right side main valve body 131 is not yet unseated from its valve seat 120f. As the pressure in system passage 123a increases, high pressure fluid passes through fluid passage 133a and moves poppet 132 on the left side valve subassembly 130a towards the right. Eventually the left side poppet 132 will push the right side poppet 132 sufficiently such that the right side valve subassembly 130b is opened, as is shown in FIG. 7. Specifically, plug 133, which is crimped to the proximal end 131e of main valve body 131, is moved to the right a sufficient distance to pull the valve seat end 131a off right valve seat 120f. This places right system fluid passage 124a in fluid communication with outlet passage 120d and then to case drain port 122.

As shown, the two springs 134 bias both valve subassemblies 130a and 130b to the closed position when the hydraulic system is at or near the neutral position, where there may be a relatively small pressure differential between the pressure sides. This design improves efficiency over shuttle valve designs which may permit fluid flow between the two system sides; such cross-flow decreases performance of the system and in a hydraulically driven vehicle can significantly impair vehicle ride quality. The use of springs 134 permits a broader range of pressures where both valves remain closed. Furthermore, keeping both valves closed at or near neutral improves the warm-up characteristics of the system since there is no oil lost to sump during the startup process. Other prior art hot oil shuttle designs which operate in a manner similar to that described herein are significantly more complex and expensive to manufacture and assemble. In certain applications, one could eliminate springs 134 and simply rely on the opposing pressure in both system fluid passages 123a and 124a to keep both valves in the closed position at neutral.

The smaller size of poppets 132 compared to the size of valve seat ends 131a maintains the valve bodies 131 in the closed position until a sufficient pressure differential between first fluid side 123a and second fluid side 124a is generated. When the first fluid side 123a is at higher pressure, and the pressure differential between it and the second fluid side 124a reaches a first set amount, first poppet 132 will cause second valve body 131 to move to its open position. Similarly, when the second fluid side 124a is at higher pressure, and the pressure differential between it and the first fluid side 123a reaches a second set amount, second poppet 132 will cause first valve body 131 to move to its open position. The first set amount is preferably equal to the second set amount.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

I claim:

1. A loop flushing valve for use in a system having a first system fluid passage in fluid communication with a second system fluid passage, the loop flushing valve comprising:
   a first valve body disposed in the first system fluid passage including a first bore connected to a second bore via a first internal shoulder;
   a first fluid passage plug at least partially disposed in the first bore, the first fluid passage plug including a first fluid passage in fluid communication with the first bore and the first system fluid passage;
   a first poppet slidably retained in the first valve body by the first fluid passage plug and the first internal shoulder and extending through the second bore;
   a second valve body disposed in the second system fluid passage including a third bore connected to a fourth bore via a second internal shoulder;
   a second fluid passage plug at least partially disposed in the third bore, the second fluid passage plug including a second fluid passage in fluid communication with the third bore and the second system fluid passage; and
   a second poppet slidably retained in the second valve body by the second fluid passage plug and the second internal shoulder and extending through the fourth bore to engage the first poppet.

2. The loop flushing valve of claim 1, further comprising a first spring to urge the first valve body toward a first seat in the first system fluid passage.

3. The loop flushing valve of claim 2, wherein the first spring engages the first fluid passage plug.

4. The loop flushing valve of claim 3, further comprising a second spring to urge the second valve body toward a second seat in the second system fluid passage, wherein the second spring engages the second fluid passage plug.

5. The loop flushing valve of claim 4, wherein the system further comprises an outlet port in fluid communication with the first and second system fluid passages, and the first bore and the third bore are in selective fluid communication with the outlet port.

6. The loop flushing valve of claim 5, wherein the loop flushing valve is closed when a pressure differential between the first system fluid passage and the second system fluid passage is below a set amount.

7. The loop flushing valve of claim 3, wherein the first fluid passage plug includes a first spring grip serration to engage the first spring.

8. The loop flushing valve of claim 7, further comprising a second spring to urge the second valve body toward a second seat in the second system fluid passage, wherein the second spring engages the second fluid passage plug, and the second fluid passage plug includes a second spring grip serration to engage the second spring.

9. The loop flushing valve of claim 8, wherein the first valve body is crimped around the first fluid passage plug and the second valve body is crimped around the second fluid passage plug.

10. A loop flushing valve assembly for use with a system having a first system fluid passage and a second system fluid passage, the loop flushing valve assembly comprising:
    a first valve subassembly disposed in the first system fluid passage, the first valve subassembly comprising:
       a first valve body including a first internal shoulder between a first bore and a second bore;
       a first fluid passage plug at least partially disposed in the first bore and including a first fluid passage in fluid communication with the first system fluid passage and the first bore; and
       a first poppet slidably captured in the first bore between the first internal shoulder and the first fluid passage plug and extending through the second bore; and
    a second valve subassembly disposed in the second system fluid passage, the second valve subassembly comprising:
       a second valve body including a second internal shoulder between a third bore and a fourth bore;
       a second fluid passage plug disposed in the third bore and including a second fluid passage in fluid communication with the second system fluid passage and the third bore; and
       a second poppet slidably captured in the third bore between the second internal shoulder and the second fluid passage plug and extending through the fourth bore, wherein the first poppet and the second poppet engage one another in response to a pressure differential between the first and second system fluid passages.

11. The loop flushing valve assembly of claim 10, wherein the first system fluid passage includes a first seat and the first valve subassembly further comprises a first spring to urge the first valve body toward the first seat.

12. The loop flushing valve assembly of claim 11, wherein the first spring engages the first fluid passage plug.

13. The loop flushing valve assembly of claim 12, wherein the first fluid passage plug includes a first spring grip serration to engage the first spring.

14. The loop flushing valve assembly of claim 13, wherein the second system fluid passage includes a second seat and the second valve subassembly further comprises a second spring to urge the second valve body toward the second seat, the second spring engages the second fluid passage plug, and the second fluid passage plug includes a second spring grip serration to engage the second spring.

15. The loop flushing valve assembly of claim 10, wherein the first valve body is crimped around the first fluid passage plug.

16. The loop flushing valve assembly of claim 10, wherein the system further comprises an outlet port in fluid communication with the first and second system fluid passages, and the first bore and the third bore are in selective fluid communication with the outlet port, and the loop flushing valve assembly is closed when the pressure differential between the first system fluid passage and the second system fluid passage is below a set amount.

* * * * *